UNITED STATES PATENT OFFICE.

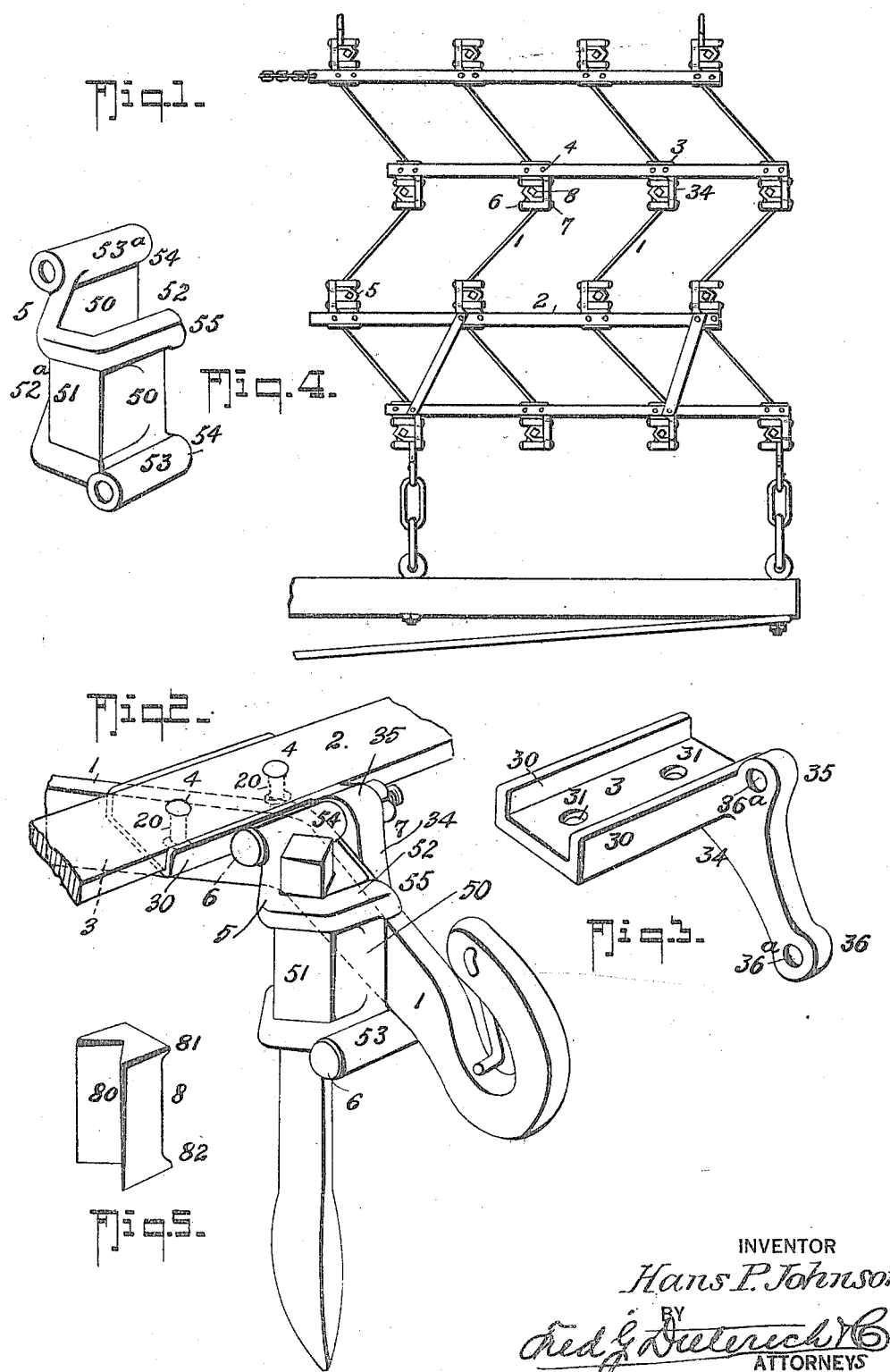

HANS P. JOHNSON, OF RACINE, WISCONSIN.

HARROW.

1,255,425.  Specification of Letters Patent.  Patented Feb. 5, 1918.

Application filed April 27, 1917.  Serial No. 164,985.

*To all whom it may concern:*

Be it known that I, HANS P. JOHNSON, a citizen of the United States, residing at Racine, in the county of Racine and State of Wisconsin, have invented certain new and useful Improvements in Harrows, of which the following is a specification.

My invention, which relates generally to improvements in harrows, is more especially designed to provide an improved combined coupling and clamping device, particularly adapted for coupling the tooth carrying or drag bars with the cross or connecting bars and for clamping the harrow teeth to the said drag bars.

Primarily, my invention has for its objects to provide a combined bar coupling and tooth clamping device of a simple and economical construction, by the use of which the operation of applying a new tooth or removing a broken one can be conveniently effected without releasing the coupling connection between the drag and the cross bars and in which the parts, that constitute the combined coupling and clamping device, form a very rigid and stable means adapted for fixedly connecting the tooth and the cross bars and which, when applied, cannot work loose.

My invention consists in the peculiar construction and novel combination of the parts hereinafter explained, specifically pointed out in the appended claims and illustrated in the accompanying drawings, in which:

Figure 1 is a plan view of my invention, so much of a zig zag type of a harrow being shown as is necessary for illustrating the practical application of my said invention.

Fig. 2 is a perspective view of the combined coupling and clamping device that constitutes my invention.

Fig. 3 is a perspective view of the coupling portion or member that connects the tooth carrying and cross bars.

Fig. 4 is a similar view of the tooth clamping or clip member.

Fig. 5 is a perspective view of the tooth receiving or seat block hereinafter referred to.

In the drawings, 1 designates a portion of a zig zag shaped tooth carrying or drag bar and 2 a portion of a cross or tie bar and the latter, when my improvements are applied, is coupled with the drag bar 1 in the manner best shown in Fig. 2, which illustrates my improved combined coupling and clamping device as rigidly coupling up the said bars 1 and 2 and for clamping a drag tooth onto the tooth bar 1.

The combined coupling and clamping device comprises a coupling section that includes a horizontal or flat body 3 formed with side flanges 30 and which is of a width to snugly fit up against the under side of the cross bar 2 with its flanges 30 embracing the opposite edges thereof.

The body member 3 also has a pair of apertures 31—31 that register with like apertures 20—20 in the bar 2, provided for the reception of rivets 4—4 that are secured, as is indicated by dotted lines on Fig. 2.

The coupling section, shown in detail in Fig. 3, includes a bracket arm 34 that is cast integral with the body 3 at one end thereof and projected downwardly from one side of the said body at an angle approximately forty-five degrees to the plane of the said body, the reason for which will presently appear, and at its upper and lower ends the arm is cast with ears 35—36, each of which has an aperture $36^a$ that extends in a plane parallel with the sides of the body, as shown.

5 designates what I term the tooth clamping member, and the said member, the construction of which is best shown in Fig. 4, consists of opposite side members 50—50 joined at one end by a loop portion 51 substantially V-shape in cross section.

One of the side members 50 has its upper end terminating in a horizontal flange 52 and its lower end formed with a horizontally extended apertured boss 53, the other side member 50 being similarly provided with a flange $52^a$ and an apertured boss $53^a$, except the flange on the other side is located at the bottom and the boss $53^a$ is located at the top edge. Each boss 53—$53^a$ and flange 52—$52^a$ extends beyond the front or open end of the clamping member, whereby to form lugs 54—55, the function of which is clearly shown in Fig. 2 of the drawings, from which it will be seen that the bracket arm 34 of the coupling member is of such length, relatively to the width of the drag bar 1, that when the said coupling member is operatively applied to couple the drag bar 1 to the cross bar 2, the upper and lower apertured ears 35 and 36 are respectively above and below the said bar 1 and are positioned for alining with the apertured bosses 53—$53^a$ at the upper and lower edges of the clamping member 5 to provide for the convenient application of bolts 6—6 which, when drawn up by the nuts 7—7, firmly secure the clamp member up onto the drag bar; a very rigid connection of the member 5 with the bar being provided for by having the lugs 54—55 lap over the upper and lower edges of the said bar, as shown.

8 designates what I term a tooth seat block, since the inner face of the tooth seats on the said block.

To securely hold the conventional type of tooth in proper engagement with the seat block, the said block has a V-shape groove or seat 80 that extends its full length and which coöperates with the V-shape loop end of the clamp member 5 for gripping the said conventional form of tooth shank.

To provide against vertical displacement, the seat block has its upper and lower ends formed with shoulders 81—82 that fit over the upper and lower edges of the drag or tooth bar, as shown.

From the foregoing description taken in connection with the drawings, the complete construction, the manner in which my combined coupling and clamping device is operatively applied and the advantages thereof will be readily apparent.

The coöperative relation of the several parts that constitute my invention is such that they can be quickly and conveniently applied for rigidly connecting the drag and the cross bars and at the same time clamp the tooth properly positioned on the drag bar.

Furthermore, the parts are so formed and are capable of such connection that, when necessary to replace a broken tooth with a new one, the operation of tooth removing and replacing can be almost instantly effected by simply loosening the nuts 7 on the bolts 6 and likewise tightening them when the new tooth has been inserted and such adjustment or repair of parts can be made without a complete separation of the drag bar from the cross bar, since removal of the bolts or the nuts 7 is not necessary to make the required repairs.

What I claim is:

1. In a harrow, the combination with a drag bar and a cross bar, of a combined means for rigidly coupling the drag and the cross bars and for clamping a tooth on the drag bar, the said means including a bracket adapted for being fixedly secured to the cross bar and including a member that extends along side of the drag bar, a tooth clamping member that engages that side of the drag bar opposite the side where the bracket passes and nut and bolt connections coöperating with the clamping member and the bracket for clamping the tooth clamping member and the bracket against the drag bar.

2. A structure as specified in claim 1, said tooth clamping member including upper and lower lock shoulders for engaging the top and bottom edges of the drag bar.

3. In a harrow, the combination with a drag bar and a cross bar, of a means for rigidly coupling the drag and the cross bars together and for clamping a tooth onto the drag bar, the said means including a bracket adapted for being fixedly secured to the cross bar and including a member that extends along one side of the drag bar, a yoke shape tooth clamping member that engages the other side of the drag bar, said tooth clamping member including upper and lower shoulders for engaging the top and bottom edges of the drag bar and means for fixedly securing the said clamping member and the bracket onto the drag bar.

4. A structure as specified in claim 1, said tooth clamping member being yoke shaped and including a V-shaped seat for receiving one of the angled edges of the tooth, and a tooth engaging block having a V-shaped seat for engaging the opposite angled edge of the tooth, the said block having upper and lower flanges for looping over the upper and lower edges of the drag bar.

5. As a new article, a combined bar coupling and tooth clamping device for harrows, comprising an apertured flat body portion adapted for fitting against and secured on the under side of a harrow frame cross bar, a bracket arm integral with the said body that is pendent to the body and extended therefrom in a plane approximately forty-five degrees from the said body, said arm being adapted for extending over one side of a drag bar and including apertured ears located one above and the other below the drag bar top and bottom edges, a tooth clamping member having apertured bosses, a seat block for coöperating with the tooth clamping member and bolt and nut devices for coöperating with the apertured ears in the bracket arm and the bosses in the clamping plate.

HANS P. JOHNSON.

Copies of this patent may be obtained for five cents each, by addressing the "Commissioner of Patents, Washington, D. C."